(12) United States Patent
Yau et al.

(10) Patent No.: US 10,397,176 B2
(45) Date of Patent: Aug. 27, 2019

(54) METHOD AND SYSTEM FOR INTERWORKING OF RCS UNIVERSAL PROFILE AND PRE-UNIVERSAL PROFILE CLIENTS

(71) Applicant: Syniverse Technologies, LLC, Tampa, FL (US)

(72) Inventors: Edward Yau, Tseung Kwan O (HK); Faron Achziger, Tampa, FL (US); Prashant Datar, Tampa, FL (US); Kin Cheung, Tuen Mun (HK); Frank Chun, Tseung Kwan O (HK); Patrick Correia, Tampa, FL (US)

(73) Assignee: Syniverse Technologies, LLC, Tampa, FL (US)

( * ) Notice: Subject to any disclaimer, the term of this patent is extended or adjusted under 35 U.S.C. 154(b) by 0 days.

(21) Appl. No.: 16/244,849

(22) Filed: Jan. 10, 2019

(65) Prior Publication Data

US 2019/0222550 A1 Jul. 18, 2019

Related U.S. Application Data

(60) Provisional application No. 62/621,297, filed on Jan. 24, 2018, provisional application No. 62/615,951, filed on Jan. 10, 2018.

(51) Int. Cl.
*G06F 15/16* (2006.01)
*H04L 12/58* (2006.01)
(Continued)

(52) U.S. Cl.
CPC .......... *H04L 51/36* (2013.01); *H04L 65/1006* (2013.01); *H04L 65/1069* (2013.01); *H04L 67/02* (2013.01)

(58) Field of Classification Search
CPC ..... H04L 51/36; H04L 67/02; H04L 65/1006; H04L 65/1069
See application file for complete search history.

(56) References Cited

U.S. PATENT DOCUMENTS

2010/0011069 A1* 1/2010 Haruna .............. H04L 51/36 709/206
2011/0072099 A1* 3/2011 Harju .............. H04L 51/066 709/206

(Continued)

*Primary Examiner* — Hieu T Hoang
(74) *Attorney, Agent, or Firm* — Andriy Lytvyn; Smith & Hopen, P.A.

(57) ABSTRACT

This invention is a system and method for an interworking function that handles communications between Rich Communication Services (RCS) Pre-Universal Profile (Pre-UP) and Universal Profile (UP) clients, and their Controlling Function and Participating Function service points. The interworking function supports the interworking for Pre-UP and UP clients in the following scenarios: 1) CPM Standalone Messaging and CPM 1-to-1 Chat, 2) CPM Chat and IM/SIMPLE Chat, 3) File Transfer by MSRP and File Transfer by HTTP, and 4) Open Group Chat and Closed Group Chat. The interworking function performs the necessary SIP message conversation and/or headers and message bodies manipulation, acts as MSRP client and server, acts as a HTTP server to store file for file transfer interworking, and acts as message proxy for Controlling Function and Participating Function.

16 Claims, 11 Drawing Sheets

(51) Int. Cl.
*H04L 29/08* (2006.01)
*H04L 29/06* (2006.01)

(56) References Cited

U.S. PATENT DOCUMENTS

| | | | |
|---|---|---|---|
| 2012/0084377 A1* | 4/2012 | Lee | H04L 51/00 709/206 |
| 2012/0084668 A1* | 4/2012 | Rohnert | H04L 51/24 715/752 |
| 2012/0117177 A1* | 5/2012 | Lu | H04L 51/36 709/206 |
| 2018/0167345 A1* | 6/2018 | Synal | H04L 51/066 |
| 2019/0044980 A1* | 2/2019 | Russell | H04L 65/1016 |

* cited by examiner

METHOD AND SYSTEM FOR INTERWORKING OF RCS UNIVERSAL PROFILE AND PRE-UNIVERSAL PROFILE CLIENTS

PRIORITY CLAIM

This non-provisional patent application claims priority to U.S. Provisional Application No. 62/615,951 filed Jan. 10, 2018 and U.S. Provisional Application No. 62/621,297 filed Jan. 24, 2018, both of which are incorporated herein by reference.

BACKGROUND OF THE INVENTION

1. Field of the Invention

This invention relates generally to the field of telecommunications networks, specifically to the mobile Rich Communication Services (RCS) in IP Multimedia Subsystem (IMS) network. More specifically, it relates to methods and systems of performing interworking between RCS Universal Profile (UP) and Pre-Universal Profile (Pre-UP) clients.

2. Brief Description of the Related Art

IP Multimedia Subsystem (IMS) is an architecture framework for delivering IP multimedia services. It was defined by $3^{rd}$ Generation Partnership Project (3GPP) as a standard for mobile client device communications via IP networks.

Rich Communication Services (RCS) is defined by GSM Association (GSMA) to specify the services that RCS clients may offer for communications. RCS rides on IMS as the underlying communication framework. RCS services include standalone messaging, 1-to-1 chat, group chat, file transfer, content sharing, social presence information, IP voice call, IP video call, geolocation services, and others. RCS adopts standard defined by 3GPP and Open Mobile Alliance (OMA) for technical implementation of these services.

RCS Universal Profile clients are defined by RCS as a standard for features that mobile device must support, in order to be interoperable with one another. RCS clients that were developed prior to the Universal Profile (UP) specifications, and hence do not conform to these specifications, are generally referred to as "Pre-Universal Profile (Pre-UP)" clients.

Pre-UP and UP clients have different implementations of RCS services. For this reason, there are interoperability issues between these two sets of clients. Thus, there exists a strong but heretofore unmet need for a method and a system that enable interworking of Pre-UP and UP clients, by bridging the Controlling Function and Participating Function of Pre-UP and UP clients and performing both protocol translation and message mediation in the communication.

SUMMARY OF THE INVENTION

This invention consists of networking and application systems that handle communications between Pre-UP and UP clients, and their Controlling Function (CF) and Participating Function (PF) service points.

In an embodiment, the interworking function (IWF) includes a Session Initiation Protocol (SIP) Application Server (AS) and a Message Session Relay Protocol (MSRP) Server. IWF enables interworking for Pre-UP and UP clients for 1) CPM Standalone Messaging and CPM 1-to-1 Chat, 2) CPM Chat and IM/SIMPLE Chat, 3) File Transfer by MSRP and File Transfer by HTTP, and 4) Open Group Chat and Closed Group Chat.

CPM Standalone Message (Pager Mode) and CPM 1-to-1 Chat interworking are performed by executing the following steps: 1) establishing a SIP Application Server (AS) that translates the SIP MESSAGE on Standalone Message side to SIP INVITE on 1-to-1 Chat side, and 2) establishing a MSRP server that initiates a MSRP session towards the 1-to-1 Chat side, using the message content from the SIP MESSAGE of the Standalone Message side.

CPM Standalone Message (Large-Message Mode) and CPM 1-to-1 Chat interworking are performed by executing the following steps: 1) establishing a SIP Application Server (AS) that proxies the SIP INVITE on Standalone Message side to SIP INVITE on 1-to-1 Chat side with headers manipulations, and 2) establishing a MSRP server that proxies the MSRP session between the Standalone Message side and 1-to-1 Chat side.

CPM Chat and IM/SIMPLE Chat interworking are performed by executing the following steps: 1) establishing a SIP Application Server (AS) that proxies the SIP INVITE on CPM Chat side to SIP INVITE on IM/SIMPLE Chat side with headers manipulations, and 2) establishing a MSRP server that proxies the MSRP session between the CPM Chat side and IM/SIMPLE Chat side.

File Transfer (FT) from MSRP to HTTP interworking is performed by executing the following steps: 1) establishing a SIP Application Server (AS) that translates the SIP INVITE on MSRP-FT side to a SIP MESSAGE on the HTTP-FT side for notification of file URL, and 2) establishing a MSRP server that stores the file uploaded from MSRP-FT side, and 3) establishing an HTTP server that allows HTTP client from HTTP-FT side to download the file via HTTP.

File Transfer (FT) from HTTP to MSRP interworking is performed by executing the following steps: 1) establishing a HTTP Server that stores the file uploaded from HTTP-FT side, 2) establishing a SIP Application Server (AS) that sends a SIP MESSAGE to recipient on MSRP-FT side on notification of file URL, and 3) establishing a MSRP client to send the file to the recipient on MSRP-FT side via MSRP.

Open Group Chat (OGC) and Closed Group Chat (CGC) interworking is performed by first establishing a SIP Application Server (AS) that proxies the SIP INVITE message between OGC and CGC side. In a Group Chat with both OGC and CGC participants, when an OGC user adds a new participant, the SIP AS initiates a new Group Chat to the CGC side, with all existing participants and the new user. The SIP AS bridges the two Group Chats—i.e., the old Group Chat having OGC participants and the new Group Chat having CGC participants.

In a Group Chat with both OGC and CGC participants, when a CGC user adds a new participant, a new Group Chat will be created by the Controlling Function. SIP AS keeps the existing Group Chat to the OGC side, and sends a SIP 'REFER' to the Controlling Function of the existing Group Chat, which sends a SIP INVITE to the new user. The SIP AS bridges the two Group Chats—i.e., the old Group Chat having OGC participants and the new Group Chat having CGC participants.

BRIEF DESCRIPTION OF THE DRAWINGS

For a fuller understanding of the invention, reference should be made to the following detailed disclosure, taken in connection with the accompanying drawings, in which.

DETAILED DESCRIPTION OF THE PREFERRED EMBODIMENT

Figure 1:
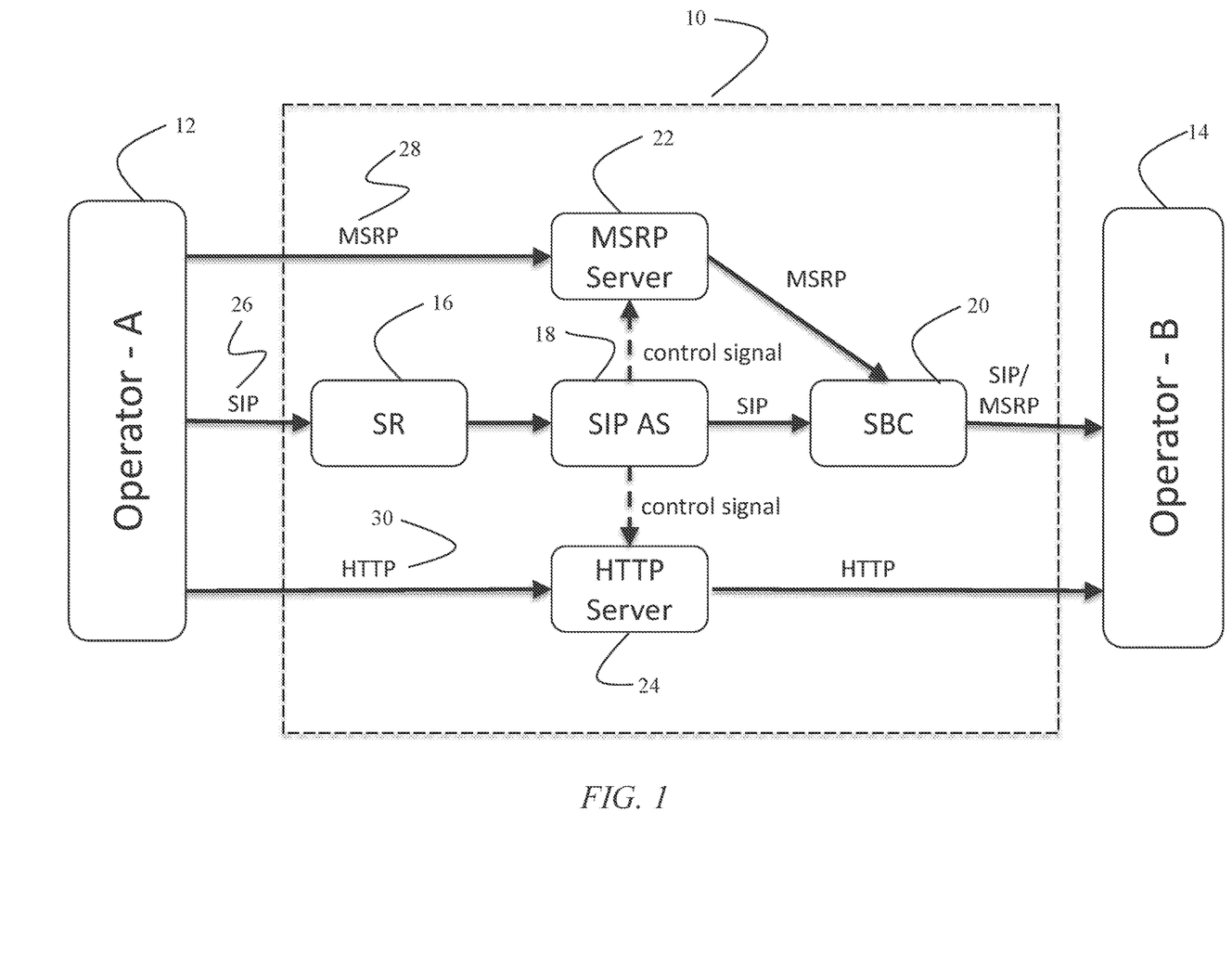
FIG. 1 is a block diagram schematically depicting the system architecture of an embodiment of the present invention.

In the embodiment depicted in FIG. 1, the invention is a specialized networking and application system that handles data communications between Operator A 12 and Operator B 14 supporting Rich Communication Services (RCS) clients of the same or different types, specifically Pre-Universal Profile (Pre-UP) and Universal Profile (UP) clients.

The present invention pertains to an Interworking Function (IWF) platform 10. In an embodiment, IWF 10 consists of Session Router (SR) 16, a Session Initiation Protocol (SIP) Application Server (AS) 18, a Session Border Controller (SBC) 20, a Message Session Relay Protocol (MSRP) Server 22 and a Hyper Text Transfer Protocol (HTTP) Server 24.

SIP is a communication protocol defined in IETF RFC3261 for multimedia communications. IMS services rely heavily on SIP for session initiation, protocol negotiation and session management.

MSRP is a protocol for transmitting instant messages in the context of a session. It is defined by IETF in RFC4975. RCS Chat and File Transfer use this protocol for transfer of messages and files between clients.

In the embodiment depicted in FIG. 1, an incoming SIP message 26 is received by SR 16 of IWF platform 10. SR 16 functions as a load balancer to distribute the SIP message 26 to SIP AS 18. SIP AS 18 identifies the capabilities of each device and performs the necessary mediation in SIP message and/or Session Description Protocol (SDP) body to carry out the interworking function. The outgoing SIP message 26 is sent to SBC 20. SBC 20 functions as a Back-to-Back User Agent (B2BUA). SBC 20 forwards SIP request 26 to the destination peer.

In the embodiment depicted in FIG. 1, MSRP messages 28 are handled by MSRP Server 22. MSRP Server 22 can function in the MSRP protocol as a MSRP client, a MSRP server, or both.

In the embodiment depicted in FIG. 1, HTTP messages (for file transfer) 30 are handled by HTTP Server 24. HTTP Server 24 may function in the HTTP protocol as an HTTP client, an HTTP server, or both.

In an alternative embodiment to the one depicted in FIG. 1, SIP messages 26 may be sent directly to the SIP AS 18, thereby, bypassing SR 16. It is also contemplated that SIP messages 26 may be sent directly from SIP AS 18 to the destination peer, thereby, bypassing SBC 20.

In an embodiment, MSRP messages 28 may be handled by SIP AS 18 instead of MSRP Server 22. Likewise, HTTP messages 30 may also be handled by SIP AS 18 instead of HTTP Server 24.

Figure 2:
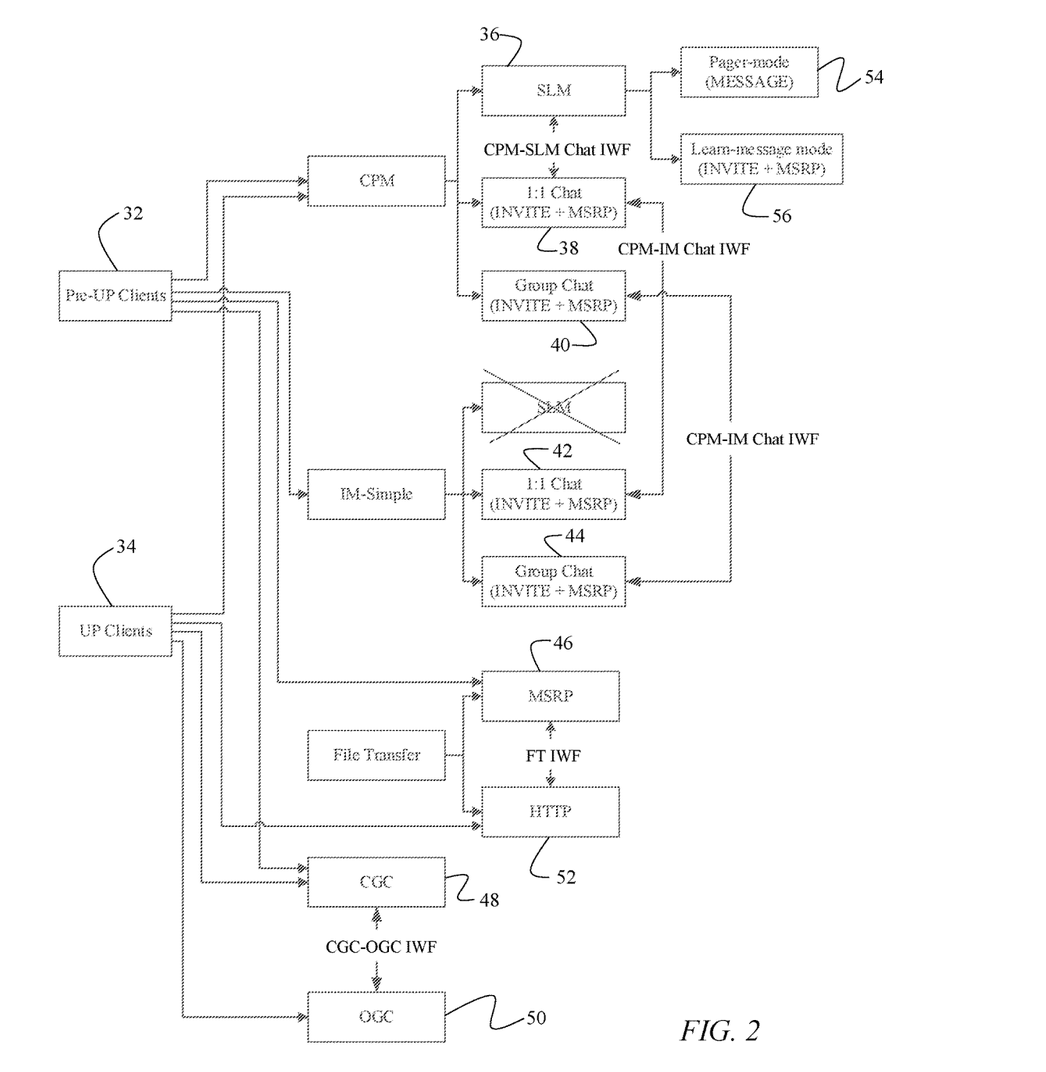
FIG. 2 is a block diagram schematically depicting the interworking scenarios of the present invention.

FIG. 2 provides a diagram depicting the services that are supported by Pre-Universal Profile (Pre-UP) clients 32 and Universal Profile (UP) clients 34. Pre-UP clients 32 support Converged IP Messaging System (CPM) Standalone (SLM) Messaging 36, CPM 1-to-1 Chat 38, CPM Group Chat 40, IM/SIMPLE 1-to-1 Chat 42, Instant Message and Presence Leveraging Extensions (IM/SIMPLE) Group Chat 44, File-Transfer by MSRP 46, and Closed Group Chat (CGC) 48.

Analogously to Pre-UP clients 32, UP clients 34 also support CPM Standalone Messaging 36, CPM Chat 1-to-1 Chat 38, CPM Group Chat 40, and CGC 48. In addition to these services, Pre-UP clients 34 also support Open Group Chat (OGC) 50. However, UP clients 32 do not support File-Transfer by MSRP 46, and, instead, support File-Transfer by HTTP 52.

CPM is a standard for multimedia IP communications defined by Open Mobile Alliance (OMA). CPM supports communication services such as Standalone Messaging 36, 1-to-1 Chat 38, Group-Chat 40 and File Transfer. For Standalone Messaging 36, two modes are defined—"Pager Mode" 54 and "Large Message Mode" 56. Pager Mode 54 is a non-session-based method to carry the message content in a single "SIP MESSAGE" message. Large Message Mode 56 is used when the message size is larger than an operator-defined size limit, in which case a session-based protocol (based on SIP INVITE and MSRP protocol) is needed. CPM SLM Messaging 36, CPM 1-to-1 Chat 38, and CPM Group-Chat 40 are endorsed by RCS.

SIP for IM/SIMPLE is an IM and Presence protocol based on SIP. It supports SML Messaging, 1-to-1 Chat 42 and Group-Chat 44. IM/SIMPLE 1-to-1 Chat 42 and Group-Chat 44 are endorsed by RCS.

RCS 5 defines both OMA IM/SIMPLE and OMA CPM for messaging. In cases where service providers have clients that are on IM/SIMPLE-capable, there is a requirement to interwork with clients that are CPM-based.

OGC 50 is a RCS group chat service where chat participants may add new participants to join the Group Chat. In contrast, in a CGC 48, no one is permitted to add new participants to the Group Chat.

FIG. 2 further depicts scenarios in which IWF Platform 10 enables communications between Pre-UP clients 32 and Universal Profile UP clients 34. Those scenarios include the following pairs of communication types: 1) CPM SLM Messaging 36 and CPM 1-to-1 Chat 38, 2) CPM 1-to-1 Chat and IM/SIMPLE 1-to-1 Chat 42, 3) CPM Group Chat 40 and IM/SIMPLE Group Chat 44; 4) File Transfer by MSRP 46 and File Transfer by HTTP 52, and 4) OGC 50 and CGC 48.

Figure 3:
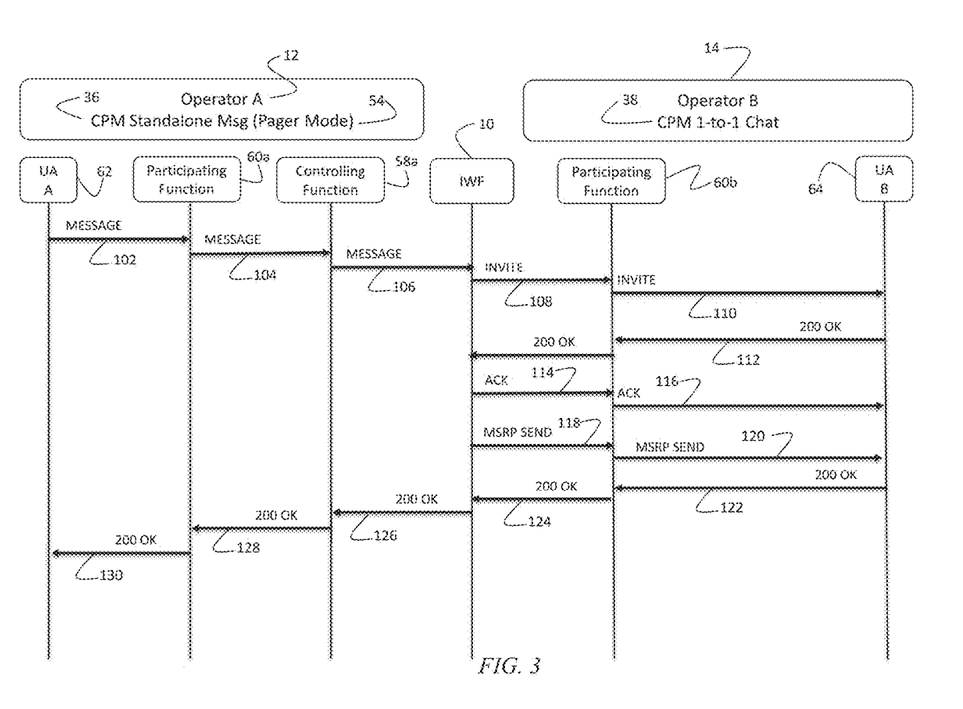
FIG. 3 is a sequential diagram schematically depicting a message flow of CPM Standalone Messaging (Pager Mode) to CPM 1-to-1 Chat interworking mechanism of the present invention.

RCS clients do not communicate with each other directly. Instead, Operator A 12 and Operator B 14 each use a Controlling Function (CF) 58 and a Participating Function (PF) 60 function as service points for RCS clients. Controlling Function 58 is a centralized function that handles the control signaling procedures for group communication services, whereas Participating Function 60 provides user network interface towards the client device. IWF platform 10 enables interworking between Pre-UP clients 32 and UP clients 34 by bridging Controlling Function 58 and Participating Function 60 of Pre-UP clients 32 and UP clients 34 and performing both protocol translation and message mediation in the communication CPM Standalone Messaging (Pager Mode) to CPM 1-to-1 Chat FIG. 3 depicts the message flow for interworking from CPM SLM 36 (Pager Mode 54) to CPM 1-to-1 Chat 38. CPM SLM 36 (Pager Mode 54) uses SIP MESSAGE for technical realization, whereas CPM 1-to-1 Chat 38 uses SIP INVITE dialog. IWF platform 10 converts SIP MESSAGE into SIP INVITE and performs the necessary headers manipulation for this interworking. IWF platform 10 retrieves the message content from the SIP MESSAGE and delivers it to CPM 1-to-1 Chat 38 destination with MSRP messages.

More specifically, in step 102, User Agent (UA) A 62 sends a SIP Message toward Participating Function 60*a* of Operator A 12. In step 104, Participating Function 60*a* sends the SIP MESSAGE to Controlling Function 58*a*. In step 106, Controlling Function 58*a* forwards the SIP MESSAGE to IWF platform 10.

IWF platform 10 converts SIP Message into SIP INVITE and performs necessary header manipulations. In step 108, sends SIP Invite to Participating Function 60*b* of Operator B 14. In step 110, Participating Function 60*b* sends SIP INVITE to UA B 64. In step 112, UA B responds to Participating Function 60*b* with SIP 200 OK message. In step 114, Participating Function 60*b* sends SIP 200 OK message to IWF 10. In step 116, IWF 10 sends SIP ACK response to Participating Function 60*b* and, in step 118, Participating Function 60*b* sends SIP ACK response to UA B 64.

IWF platform 10 retrieves the message content from the SIP MESSAGE and sends that content in a MSRP message to Participating Function 60*b*. Participating Function 60*b* sends the MSRP message to UA B 64. In responsive to receiving the MSRP message, UA B 64 responds to Participating Function 60*b* with a SIP 200 OK message in step 124. In step 126, Participating Function 60*b* forwards SIP 200 OK message to IWF 10, which, in step 128, forwards this message to Controlling Function 58*a*. In step 130, Controlling Function 58*a* forwards SIP 200 OK message to Participating Function 60*a*, which sends this message to UA A 62.

CPM Standalone Messaging (Large-Message Mode) to CPM 1-to-1 Chat

Figure 4:
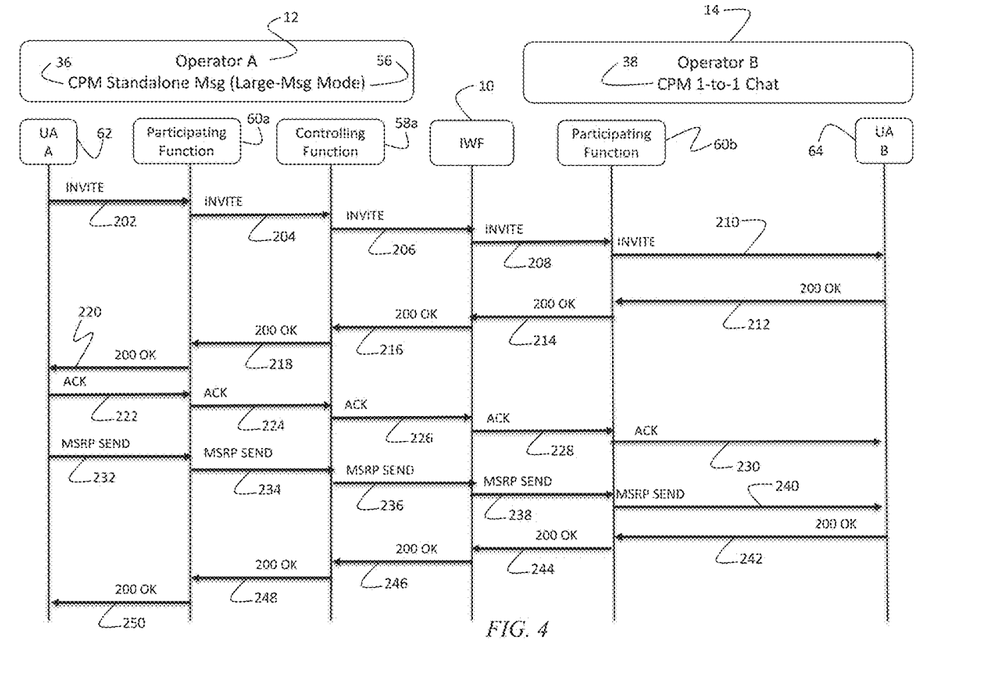
FIG. 4 is a sequential diagram schematically depicting a message flow of CPM Standalone Messaging (Large-Message Mode) to CPM 1-to-1 Chat interworking mechanism of the present invention.

FIG. 4 depicts the message flow for interworking from CPM SLM 36 (Large-Message Mode 56) to CPM 1-to-1 Chat 38. Both CPM SLM 36 (Large-Message Mode 56) and CPM 1-to-1 Chat 38 use SIP INVITE dialog. IWF 10 performs the necessary headers manipulation on the SIP INVITE message for this interworking. Chat message contents are carried in MSRP messages, which pass through IWF 10 transparently.

Specifically, FIG. 4 depicts that, in step 202, UA A 62 sends a SIP INVITE to Participating Function 60*a* of Operator A 12. In step 204, Participating Function 60*a* sends the SIP INVITE to Controlling Function 58*a*, and, in step 206, Controlling Function 58*a* sends the SIP INVITE to IWF 10. IWF 10 performs necessary headers manipulation with the SIP INVITE and, in step 208, sends the SIP INVITE with proper headers to Participating Function 60*b* of Operator B 14. In step 210, Participating Function 60*b* forwards the SIP INVITE to UA B 64. In steps 212-220, SIP 200 OK response is routed from UA B 64 to UA A 62 via Participating Function 60*b*, IWF 10, Controlling Function 58*a*, and Participating Function 60*a*. In steps 222-230, SIP ACK message is routed from UA A 62 to UA B 64 via Participating Function 60*a*, Controlling Function 58*a*, IWF 10, and Participating Function 60*b*.

Next, in step 232, UA A 62 sends a MSRP message, and, in steps 234-240, the MSRP message is forwarded to UA B 64 via Participating Function 60*a*, Controlling Function 58, IWF 10, Participating and Function 60*b*. In response to receiving the MSRP message, UA B 64 sends SIP 200 OK message in step 242. In steps 242-250, this SIP 200 OK message is routed to UA A 62 via the same path as the SIP 200 OK message, as disclosed in the preceding paragraph.

CPM 1-to-1 Chat to CPM Standalone Messaging (Large-Message Mode)

Figure 5:
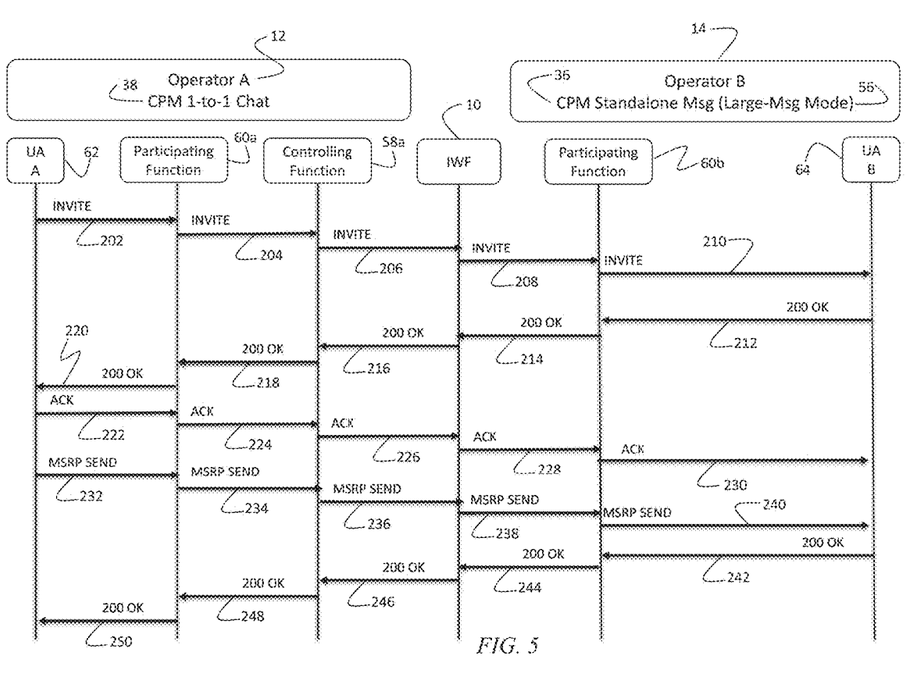
FIG. 5 is a sequential diagram schematically depicting a message flow of CPM 1-to 1 Chat to CPM Standalone Messaging (Large-Message Mode) interworking mechanism of the present invention.

FIG. 5 depicts the message flow for interworking from CPM 1-to-1 Chat 38 to CPM SLM 36 (Large-Message Mode 56). In this embodiment, CPM SML 36 Large-Message Mode 56 is always used for conversion from CPM 1-to-1 Chat 38, even if the message size is small. Both CPM SML 36 Large-Message Mode 56 and CPM 1-to-1 Chat 38 use SIP INVITE dialog. IWF 10 performs the necessary headers manipulation on the SIP INVITE message for this interworking. Chat message contents are carried in MSRP messages, which pass through IWF 10 transparently. The message flow follows the same steps 202-250 described in the preceding paragraph.

In an alternative embodiment, CPM SLM 36 (Pager Mode 54) may be used for conversion from CPM 1-to-1 Chat 38, if the message size is small. In this case, IWF 10 converts SIP INVITE dialog into SIP MESSAGE, with message content extracted from MSRP message and put into the SIP MESSAGE body.

CPM Chat to IM/SIMPLE Chat

Figure 6:
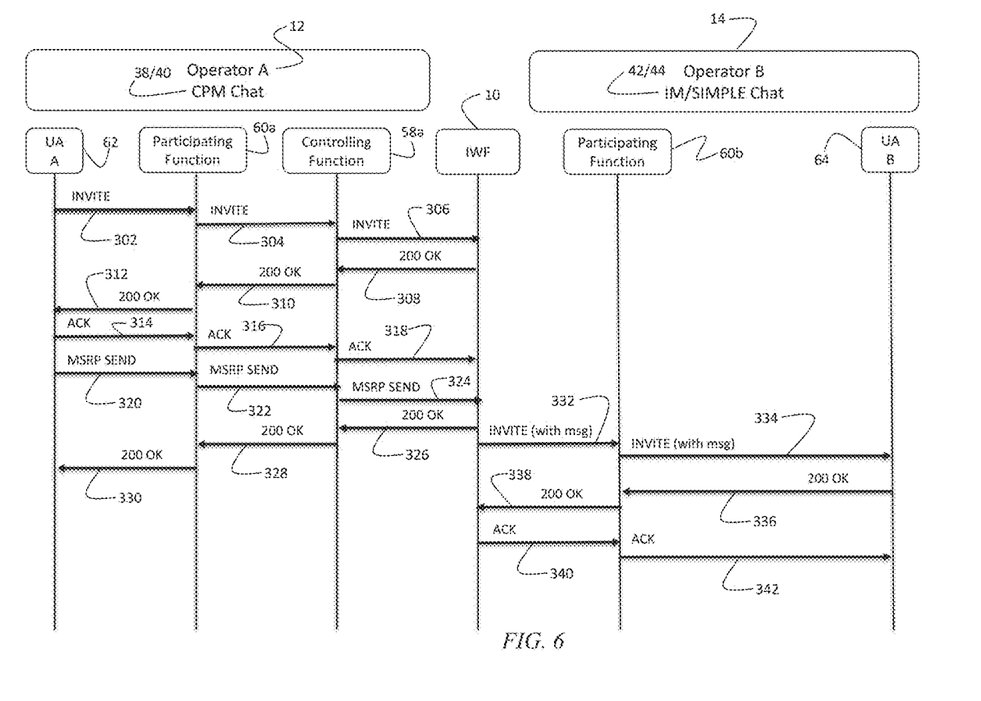
FIG. 6 is a sequential diagram schematically depicting a message flow of CPM Chat to IM/SIMPLE Chat interworking mechanism of the present invention.

FIG. 6 depicts the message flow for interworking from CPM 1-to-1 Chat 38 to IM/SIMPLE 1-to-1 Chat 42 and also from CPM Group Chat 40 to IM/SIMPLE Group Chat 44. CPM 1-to-1 Chat 38, CPM Group Chat 40, IM/SIMPLE 1-to-1 Chat 42, and CPM Group Chat 44 use SIP INVITE dialog. IWF 10 performs the necessary headers manipulation on the SIP INVITE message for this interworking. IWF 10 extracts first Chat message from the MSRP message from the sender of CPM 1-to-1 Chat 38 or CPM Group Chat 38 and puts the Chat message into the SIP INVITE message body directed to the recipient of IM/SIMPLE 1-to-1 Chat 42 or IM/SIMPLE Group Chat 44. Chat message contents in subsequent dialogs are carried in MSRP messages, which pass through IWF 10 transparently.

Specifically, in step 302, UA A 62 sends a SIP INVITE to Participating Function 60*a* of Operator A 12. In step 304, Participating Function 60*a* forwards the SIP INVITE to Controlling Function 58*a*. In step 306, Controlling Function 58*a* forwards SIP INVITE to IWF 10. In steps 308-312, SIP 200 OK response is forwarded from IWF 10 to UA A 62 via Controlling Function 58*a* and Participating Function 60*a*. Subsequently, in steps 314-318, SIP ACK message is forwarded from UA A 62 to IWF 10. SIP Session between UA A 62 and IWF 10 is now established.

In step 320, UA A 62 sends a MSRP SEND message to Participating Function 60*a*. In step 322, Participating Function 60*a* forwards the MSRP SEND message to Controlling Function 58*a*, which, in step 324, forwards the MSRP SEND message to IWF 10. IFW 10 responds with SIP 200 OK message. IWF 10 sends SIP 200 OK message to Controlling Function 58*a* in step 326. In step 328, Controlling Function 58*a* forwards the SIP 200 OK message to Participating Function 60*a*, which then forwards the SIP 200 OK message to UA A 62.

IWF 10 extracts Chat message from the MSRP SEND request received in step 324. IWF 10 puts the extracted Chat message into a body of a SIP INVITE message and, in step 332, sends the SIP INVITE message to Participating Function 60*b* of Operator B 14. In step 334, Participating Function 60*b* forwards the SIP INVITE message to UA B 64. In steps 336 and 338 SIP 200 OK message is forwarded form UA B 64 to IWF 10 by Participating Function 60*b*. IWF responds to Participating Function 60*b* with a SIP ACK message, which Participating Function 60*b* forwards to UA B in step 342. Chat message contents in subsequent dialogs are carried in MSRP messages.

IM/SIMPLE Chat to CPM Chat

Figure 7:
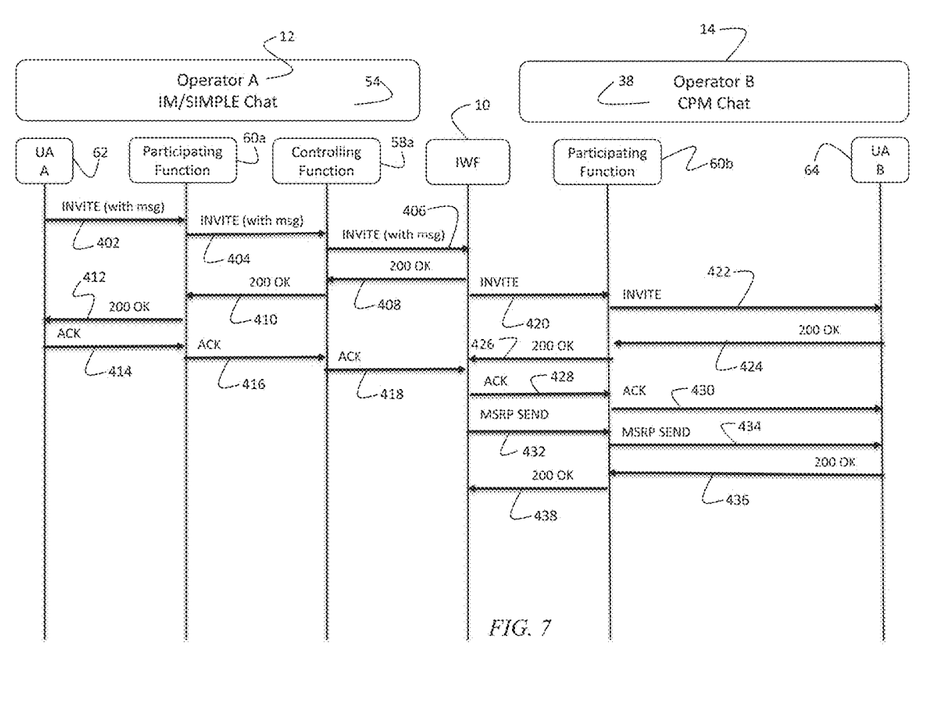
FIG. 7 is a sequential diagram schematically depicting a message flow of IM/SIMPLE Chat to CPM Chat interworking mechanism of the present invention.

FIG. 7 depicts the message flow for interworking from IM/SIMPLE 1-to-1 Chat 38 to CPM 1-to-1 Chat 42 or IM/SIMPLE Group Chat 38 to CPM Group Chat 42. Both CPM Chat and IM/SIMPLE Chat use SIP INVITE dialog. IWF 10 performs the necessary header manipulation on the SIP INVITE message for this interworking. IWF 10 extracts the first Chat message from the SIP INVITE message from the sender of IM/SIMPLE Chat and puts the extracted first Chat message into the MSRP message body and sends it to the recipient of CPM Chat. Chat message contents in subsequent dialog are carried in MSRP messages, which pass through IWF 10 transparently.

Continuing reference to FIG. 7, in step 402, UA A 62 sends a SIP INVITE with a Chat message to PF 60*a*. In step 404, PF 60*a* forwards the SIP INVITE with the Chat message to CF 58*a*, which, in step 406, forwards it to IWF 10. In steps 408-412, SIP 200 OK response is forwarded from IWF 10 to UA A 62 via CF 58*a* and PF 60*a*.

Upon receipt of the SIP INVITE with the Chat message, IWF 10 extracts the Chat message. IWF 10 performs necessary header manipulation on the SIP INVITE message, and, in step 420, IWF 10 sends the SIP INVITE to PF 60*b* of Operator B 14. In step 422, PF 60*b* forwards the SIP INVITE to UA B 64. In steps 424-426, UA B 64 responds to PF 60*b* with a SIP 200 OK message, which PF 60*b* then forwards to IWF 10. In steps 428, IWF 10 responds to PF 60*b* with a SIP ACK message, which, in step 430, PF 60*b* forwards to UA B64.

Next, in step 432, IWF 10 puts the extracted Chat message into a MSRP message body and sends the MSRP message to PF 60*b*. In step 434, PF 60*b* forwards the MSRP message to UA B 64. In step 436, UA B 64 responds with a SIP 200 OK message, which PF 60*b* forwards to IWF 10 in step 438. Subsequent Chat message between UA A 62 and UA B 64 are carried in MSRP messages.

MSRP File Transfer to HTTP File Transfer

Figure 8:
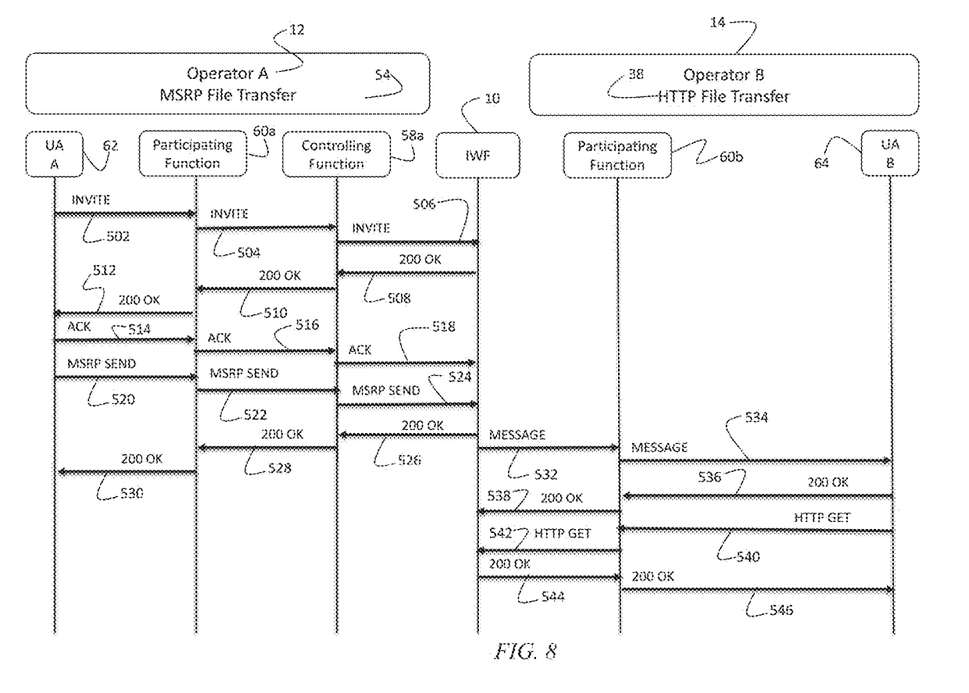
FIG. 8 is a sequential diagram schematically depicting a message flow of MSRP File Transfer to HTTP File Transfer interworking mechanism of the present invention.

FIG. 8 depicts the message flow for interworking from MSRP File Transfer 46 to HTTP File Transfer 52. MSRP File Transfer 46 uses SIP INVITE for control and MSRP for file content transfer. In contrast, HTTP File Transfer 52 uses SIP MESSAGE for control and HTTP for file content transfer. IWF 10 utilizes SIP AS 18 to terminate the SIP INVITE message and, then, IWF 10 extracts its information. IWF 10 stores the file content that the sender delivers with MSRP. IWF 10 saves the file in HTTP Server 24 for the recipient to download. IWF 10 sends a SIP MESSAGE to notify the recipient of the file transfer and its URL location. The recipient then downloads the file from the IWF 10's HTTP Server 24 via HTTP GET.

Specifically, FIG. 8 depicts that UA A 62 sends a SIP INVITE in step 502. In step 504, PF 60*a* of Operator A 12 forwards the SIP INVITE to CF 58*a*. In step 506, CF 58*a* forwards the SIP INVITE to IWF 10. IWF 10 responds to CF 58*a* with SIP 200 OK which is forwarded to UA A 62 in steps 508-512 via CF 58*a* and PF 60*a*. UA A 62 responds with a SIP ACK message which is forwarded to IWF 10 in steps 514-518. At this point, SIP session between UA A 62 and IWF 10 is established.

Next, UA A 62 sends a MSRP SEND request in step 520. In step 522, PF 60*a* forwards the MSRP SEND message to CF 58*a*. In step 524, CF 58*a* forwards the MSRP SEND message to IWF 10, and IWF 10 extracts the file content of the MSRP SEND message. IWF 10 saves the file content in HTTP Server 24 for the recipient to download. Then, in step 532, IWF 10 sends a SIP MESSAGE to PF 60*b*, which then forwards the SIP MESSAGE to UA B 64. The SIP MESSAGE notifies the recipient that the file content is available for download and provides its URL location. UA B responds with a SIP 200 OK message, which is forwarded to IWF 10 in steps 536-538. At this point, UA B 64 can retrieve the file content using HTTP GET in steps 540-542. IWF 10 responds with SIP 200 OK message in steps 544-546.

HTTP File Transfer to MSRP File Transfer

Figure 9:
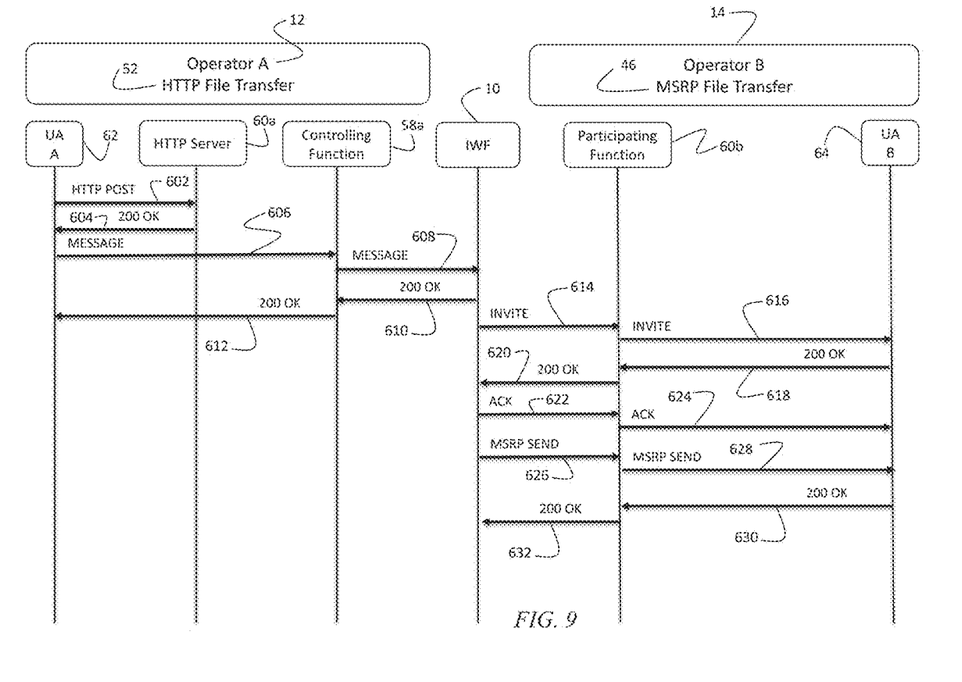
FIG. 9 is a sequential diagram schematically depicting a message flow of HTTP File Transfer to MSRP File Transfer interworking mechanism of the present invention.

FIG. 9 depicts the message flow for interworking from HTTP File Transfer 52 to MSRP File Transfer 46. MSRP File Transfer 46 uses SIP INVITE for control and MSRP for file content transfer. In contrast, HTTP File Transfer 52 uses SIP MESSAGE for control and HTTP for file content transfer. IWF 10 employs a SIP AS 18 to terminate the SIP MESSAGE and extract its information. Then, IWF 10 stores the file content that the sender delivers with HTTP POST. The file is then saved in a file store for the recipient to download. IWF 10 sends a SIP 'INVITE" to notify the recipient of the file transfer. The file is delivered to the recipient using the MSRP protocol.

More specifically, referring to FIG. 9, UA A 62 sends HTTP POST to HTTP Server 66 of Operator A 12 in step 602, and HTTP Server replies with a 200 OK response in step 604. In step 606, UA A 62 sends a SIP MESSAGE to CF 58*a* of Operator A 12. CF 58*a* forwards the SIP MESSAGE to IWF 10 in step 608. IWF 10 sends SIP 200 OK response to UA A via CF 58*a* in steps 610-612. IWF 10 extracts the information in the SIP MESSAGE and uses this information to retrieve and store the file content delivered with HTTP POST in step 602. IWF 10 stores the file content.

Next, in steps 614-616, IWF 10 sends SIP INVITE to UA B 64. SIP INVITE notifies the recipient of the file transfer. UA B 64 responds to IWF 10 with SIP 200 OK message in steps 618-620, and IWF 10 sends SIP ACK back to UA B 64 in steps 622-624. Then, in step 626, IWF 10 sends MSRP SEND message containing the file content. PF 60*b* forwards MSRP SEND to UA B 64 in step 628. In step 620 UA B 64 responds with a SIP 200 OK message, which PF 60*b* forwards to IWF 10 in step 632.

Open Group Chat to Closed Group Chat

Figure 10:
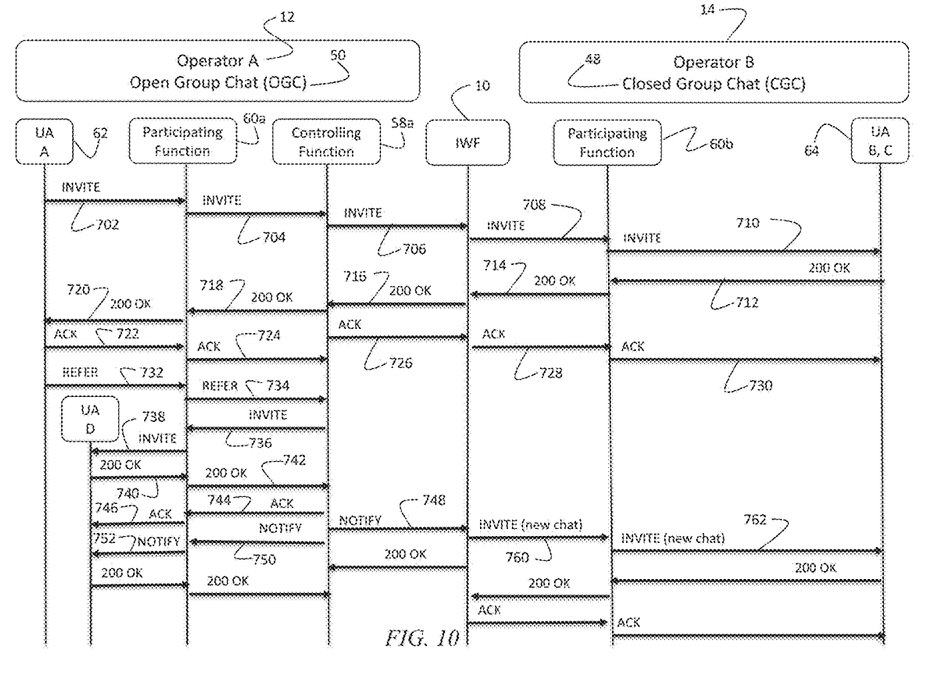
FIG. 10 is a sequential diagram schematically depicting a message flow of OGC to CGC interworking mechanism of the present invention with OGC participant adding a new OGC participant.

FIG. 10 depicts the message flow for interworking from OGC 50 to Closed Group Chat CGC 48. In this diagram, an OGC user (UA A 62) adds a new OGC user (UA D 70) after the group Chat is formed. Both OGC 50 and CGC 48 use SIP INVITE dialog to carry the Chat control signaling. IWF 10 acts as a SIP Application Server to proxy the SIP dialog. SDP attribute that indicates whether the Chat is a closed group is "a=chatroom:org.3gpp.urn%3Aurn-7%3A3gpp-application.imsari.rcs.closedgroupchat". IWF 10 adds this attribute while proxying the SIP INVITE from OGC 50 to CGC 48, and trims this attribute while proxying the SIP INVITE from CGC 48 to OGC 50. In this way, OGC users and their CF 60a and PF 58a "think" every participant is in OGC 50, while the CGC users and their CF 60b and PF 58b "think" every participant is in CGC 48.

In FIG. 10, UA A 62 sends SIP INVITE in step 702. In step 704, PF 60a forwards the SIP INVITE to CF 58a. In step 706, CF 58a forwards the SIP INVITE to IWF 10. In steps 708 and 710 IWF 10 sends the SIP INVITE to UA B 64 and UA C 68 via PF 60b. In steps 712-720 SIP 200 OK response is forwarded from UA B 64/UA C 68 to UA A via IWF 10. In steps 722-730 SIP ACK is forwarded from UA A 62 to UA B 64/UA C 68 via IWF 10.

Next, when UA A 62 adds a new OGC participant—UA D 70—UA A 62 sends a SIP 'REFER' in step 732 to CF 58a, which send a SIP INVITE to the new participant (UA D 70) in steps 736-738. After, in steps 740-742, the new participant (UA D 70) accepts the invitation, CF 58a sends a SIP 'NOTIFY' to every participant of the group (Steps 750-752 and 748-762). When this SIP 'NOTIFY' reaches IWF 10 in step 748, IWF 10 emulates a CF and creates a new Group Chat to the CGC side, which will include all the participants of the existing group (UA A 62, UA B 64, UA C 68) and the new participant (UA D 70). This is necessary because CGC 48 does not permit adding new participants. IWF 10 handles interworking of messages across the two groups (old group in OGC 50 and new group in CGC 48) in subsequent dialog.

Open Group Chat to Closed Group Chat

Figure 11:
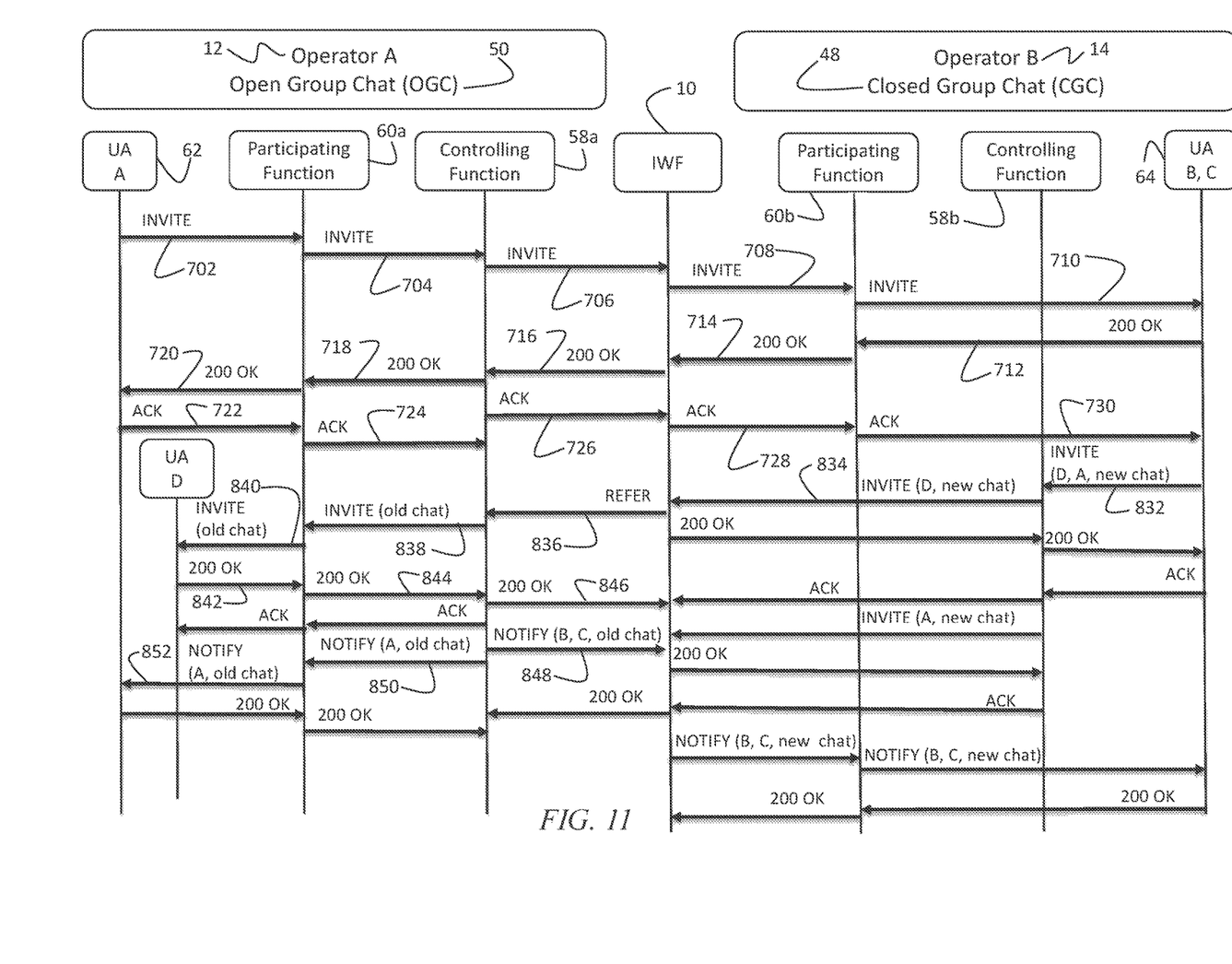
FIG. 11 is a sequential diagram schematically depicting a message flow of OGC to CGC interworking mechanism of the present invention with CGC participant adding a new CGC participant.

FIG. 11 depicts the message flow for interworking from OGC 50 to CGC 48. Steps 802-830 are the same as steps 702-730 discussed above. After step 830, a CGC user (UA B 64) adds a new CGC user (UA D 70) after the group Chat is formed. Both OGC 50 and CGC 48 use SIP INVITE dialog to carry the Chat control signaling. IWF 10 functions as a SIP Application Server to proxy the SIP dialog. SDP attribute that indicates if the Chat is a closed group is "a=chatroom:org.3gpp.urn%3Aurn-7%3A3gpp-application.ims.iariscs.closedgroupchat". IWF 10 adds this attribute while proxying the SIP INVITE from OGC to CGC, and trims this attribute while proxying the SIP INVITE from CGC 48 to OGC 50. Because of this, OGC users (UA A 62 and UA D 70) and their CF 58a and PF 60a 'think' every participant is in OGC 50, while the CGC users (UA B 64 and UB C 68) and their CF 58b and PF 60b 'think' every participant is in CGC 48.

In FIG. 11, in step 832, when a CGC user (UA B 64) adds a new CGC participant (UA D 70), the CGC user (UA B 64) initiates a new Group Chat (with both existing participants and new participant) and sends a SIP INVITE to CF 58b, which forwards the SIP INVITE to both existing participant and new participant (UA D 70). When, in step 834, this SIP INVITE reaches IWF 10 (in attempting to deliver to new participant (UA D 70)), IWF 10 emulates a participant of the existing Group Chat to add a new participant (UA D 70) to the existing Group Chat. In step 836, IWF 10 sends a SIP 'REFER' to CF 58a of the OGC side (Operator A 12). In step 838, CF 58a sends a SIP INVITE to the new participant (UA D 70). In step 840, PF 60a forwards the SIP INVITE to UA D 70.

When, in steps 842-846, the new participant (UA D 70) accepts the invitation, CF 58a sends a SIP 'NOTIFY' to all participants in steps 850-852 (for UA A 62) and steps 854-856 (for UA B 64 and UA C 68). When IWF 10 receives this SIP 'NOTIFY' (in attempting to deliver to CGC), it proxies the 'NOTIFY' to CGC side (Operator B 14) but with the new Group Chat. At the same time, when SIP INVITE from CF 58b reaches IWF 10 (in attempting to deliver to OGC participants), IWF 10 locally replies to SIP INVITE without forwarding it to OGC side (Operator A 12). IWF 10 handles interworking of messages across the two groups (old group in OGC (Operator A 12) and new group in CGC (Operator B 14) in subsequent dialog.

Hardware and Software Infrastructure Examples

The present invention may be embodied on various platforms. The following provides an antecedent basis for the information technology that may be utilized to enable the invention.

Embodiments of the present invention may be implemented in hardware, firmware, software, or any combination thereof. Embodiments of the present invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

The machine-readable medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device.

A machine-readable signal medium may include a propagated data signal with machine-readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a computer readable storage medium and that can communicate, propagate, or transport a program for use by or in connection with an instruction execution system, apparatus, or device. However, as indicated above, due to circuit statutory subject matter restrictions, claims to this invention as a software product are those embodied in a non-transitory software medium such as a computer hard drive, flash-RAM, optical disk or the like.

Program code embodied on a machine-readable medium may be transmitted using any appropriate medium, including but not limited to wireless, wire-line, optical fiber cable, radio frequency, etc., or any suitable combination of the foregoing. Machine-readable program code for carrying out operations for aspects of the present invention may be written in any combination of one or more programming languages, including an object oriented programming language such as Java, C#, C++, Visual Basic or the like and conventional procedural programming languages, such as the "C" programming language or similar programming languages.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by machine-readable program instructions.

The advantages set forth above, and those made apparent from the foregoing disclosure, are efficiently attained. Since certain changes may be made in the above construction without departing from the scope of the invention, it is intended that all matters contained in the foregoing disclosure or shown in the accompanying drawings shall be interpreted as illustrative and not in a limiting sense.

What is claimed is:

1. A system for enabling communication between a Rich Communication Services (RCS) Universal Profile (UP) client and a Pre-Universal Profile (Pre-UP) client, the system comprising:

an Interworking Function (IWF) interfacing with a Controlling Function of a first network operator and a Participating Function of a second network operator, the IWF comprising:

a Session Initiation Protocol (SIP) Application Server (AS) configured to receive an incoming Session Initiation Protocol (SIP) message from the Controlling Function of the first network operator, wherein the SIP AS is configured to execute actions selected from the group consisting of translating the incoming SIP message to a SIP INVITE message for interworking between a Converged Internet Protocol Messaging System (CPM) Standalone Message Pager Mode and a CPM 1-to-1 Chat, proxying the SIP INVITE message between the first network operator and the second network operator for interworking between a CPM Standalone Message Large-Message Mode and the CPM 1-to-1 Chat, proxying the SIP INVITE message between the first network operator and the second network operator for interworking between the CPM Chat and an Instant Message and Presence Leveraging Extension (IM/SIMPLE) Chat, translating the SIP INVITE message to the SIP message for interworking between a Message Session Relay Protocol (MSRP) File Transfer and a HyperText Transfer Protocol (HTTP) File Transfer, sending the SIP message containing a notification of a Uniform Resource Locator (URL) for interworking between the HTTP File Transfer and the MSRP File Transfer, and proxying the SIP INVITE message between the first network operator and the second network operator for interworking between an Open Group Chat (OGC) and a Closed Group Chat (CGC); and a Message Session Relay Protocol (MSRP) Server configured to send an outgoing MSRP message to the second network operator, the MSRP Server configured to execute actions selected from the group consisting of initiating a MSRP session toward the second network operator for interworking between the CPM Standalone Message Pager Mode and the CPM 1-to-1 Chat, proxying the MSRP session between the first and the second network operators for interworking between the CPM Standalone Message Large-Message Mode and the CPM 1-to-1 Chat, proxying the MSRP session between the first and the second network operators for interworking between the CPM Chat and the IM/SIMPLE Chat, and establishing a MSRP client for sending a file from the first network operator to the second network operator for interworking between the HTTP File Transfer to the MSRP File Transfer.

2. The system of claim 1, wherein the IWF further comprises a HTTP Server configured to handle HTTP messages.

3. The system of claim 1, wherein the IWF further comprises a Session Router (SR) for routing the incoming SIP message to the SIP AS.

4. The system of claim 1, wherein the IWF further comprises a Session Border Controller (SBC) for routing the SIP message from the SIP AS or a Session Router (SR) to a destination peer.

5. The system of claim 1, wherein the UP client supports the CPM Standalone Messaging, the CPM Chat, the HTTP File Transfer, the Closed Group Chat, and the Open Group Chat.

6. The system of claim 1, wherein the Pre-UP client supports the CPM Standalone Messaging, the CPM Chat, the IM/SIMPLE Chat, the MSRP File Transfer, and the Closed Group Chat.

7. The system of claim 1, wherein the IWF executes interworking between the CPM Standalone Messaging Pager Mode and the CPM 1-to-1 Chat by performing message conversion from the SIP message to the SIP INVITE message with headers manipulation, retrieving message content from the SIP message, and delivering the message content to a CPM 1-to-1 Chat destination in the outgoing MSRP message.

8. The system of claim 1, wherein the IWF executes interworking between the CPM Standalone Messaging Large-Message Mode and the CPM 1-to-1 Chat by performing headers manipulation on the SIP INVITE message, wherein Chat message contents are carried to the second network operator in the outgoing MSRP message.

9. The system of claim 1, wherein the IWF executes interworking between the CPM 1-to-1 Chat and the CPM Standalone Messaging Large-Message Mode by performing headers manipulation on the SIP INVITE message, wherein Chat message contents are carried to the second network operator in the outgoing MSRP message.

10. The system of claim 1, wherein the IWF executes interworking from the CPM Chat to the IM/SIMPLE Chat by performing headers manipulation on the SIP INVITE message, extracting a first Chat message from an incoming MSRP message, and putting the first Chat message into a body of the SIP INVITE message, wherein Chat message contents in a subsequent dialog are carried in the outgoing MSRP message.

11. The system of claim 1, wherein the IWF executes interworking between the IM/SIMPLE Chat and the CPM Chat by performing headers manipulation on the SIP INVITE message, extracting a first Chat message from the SIP INVITE message, and putting the first Chat message into an MSRP message body, wherein Chat message contents in a subsequent dialog are carried in the outgoing MSRP message.

12. The system of claim 1, wherein the IWF executes interworking from the MSRP File Transfer to the HTTP File Transfer by executing the steps comprising:
- terminating the SIP INVITE message;
- extracting file content contained in the SIP INVITE message;
- storing the file content that a sender delivers with the MSRP;
- saving the file content in the HTTP Server for a recipient to download; and
- sending the SIP message notifying the recipient of the file transfer providing the URL location for the file content, thereby enabling the recipient to download the file content from the HTTP Server via HTTP GET.

13. The system of claim 1, wherein the IWF executes interworking from the HTTP File Transfer to the MSRP File Transfer by executing the steps comprising:
- terminating the SIP message;
- extracting file content of the SIP message;
- storing the file content that a sender sent with HTTP POST;
- saving the file content in a file store for a recipient to download;
- sending the SIP INVITE message to notify the recipient of the file transfer, whereby the file is delivered to the recipient using MSRP.

14. The system of claim 1, wherein the IWF executes interworking from the OGC to the CGC by executing the steps comprising:
- proxying the SIP INVITE message from the OGC to the CGC;
- trimming a closed-group Service Delivery Platform (SDP) attribute from the SIP INVITE message to enable OGC users to communicate with every participant as in the OGC, and enabling the CGC users to communicate with every participant as in the CGC.

15. The system of claim 14, wherein when one of the OGC users add a new OGC participant, the IWF emulates the Control Function and creates a new Group Chat including all participants of the existing group and the new participant, the IWF handling interworking of messages across the old group in the OGC and the new group in the CGC in a subsequent dialog.

16. The system of claim 14, wherein when one of the CGC user adds a new CGC participant, the IWF emulates a participant of the existing Group Chat to add a new participant to the existing Group Chat by sending a SIP REFER message to the Control Function of the OGC side, wherein the Control Function of the OGC side sends a second SIP INVITE message to the new participant, and, responsive to the new participant accepting the second SIP INVITE, the Control Function sending a SIP NOTIFY message to all participants; responsive to receiving the SIP NOTIFY message, the IWF proxies the SIP NOTIFY message to the CGC side with a new Group Chat, wherein the IWF locally replies to the SIP INVITE message without forwarding the SIP INVITE message to the OGC side, the IWF handling interworking of messages across the old group in the OGC and the new group in the CGC in a subsequent dialog.

* * * * *